US012788683B2

(12) United States Patent
Fischlein et al.

(10) Patent No.: US 12,788,683 B2
(45) Date of Patent: Nov. 10, 2026

(54) CONTAINER ADAPTER AND DELIVERY ASSEMBLY

(71) Applicant: HOFFMANN-LA ROCHE INC., Little Falls, NJ (US)

(72) Inventors: Christian Fischlein, Struer (DK); Allan Lester Kierkegaard, Struer (DK)

(73) Assignee: HOFFMANN-LA ROCHE INC., Little Falls, NJ (US)

( * ) Notice: Subject to any disclaimer, the term of this patent is extended or adjusted under 35 U.S.C. 154(b) by 640 days.

(21) Appl. No.: 17/796,039

(22) PCT Filed: Jan. 28, 2021

(86) PCT No.: PCT/EP2021/052008
§ 371 (c)(1),
(2) Date: Jul. 28, 2022

(87) PCT Pub. No.: WO2021/152025
PCT Pub. Date: Aug. 5, 2021

(65) Prior Publication Data

US 2023/0048484 A1 Feb. 16, 2023

(30) Foreign Application Priority Data

Jan. 28, 2020 (EP) .................................... 20154095

(51) Int. Cl.
*A61J 1/20* (2006.01)

(52) U.S. Cl.
CPC ........... *A61J 1/2089* (2013.01); *A61J 1/2051* (2015.05)

(58) Field of Classification Search
CPC ............... F16L 2201/10; F16L 2201/60; F16L 2201/44; F16L 2201/00; A61M 39/1011;
(Continued)

(56) References Cited

U.S. PATENT DOCUMENTS

| | | | | |
|---|---|---|---|---|
| 5,342,346 | A * | 8/1994 | Honda | A61J 1/2089 604/82 |
| 2006/0089594 | A1* | 4/2006 | Landau | A61M 5/2033 604/110 |
| 2018/0200498 | A1* | 7/2018 | Sanders | A61M 39/1011 |

FOREIGN PATENT DOCUMENTS

| | | | |
|---|---|---|---|
| EP | 0565103 | A1 | 10/1993 |
| JP | H06-14973 | A | 1/1994 |

(Continued)

OTHER PUBLICATIONS

International Search Report and Written Opinion issued Apr. 12, 2021 in Intl Appl. No. PCT/EP2021/052008.

(Continued)

*Primary Examiner* — Guy K Townsend
*Assistant Examiner* — Alessandro R Del Priore
(74) *Attorney, Agent, or Firm* — MEDLER FERRO WOODHOUSE & MILLS PLLC

(57) ABSTRACT

A container adapter for a medical delivery device is disclosed that has a container seat, a dosage chamber, a dosing mechanism and a lock mechanism. The lock mechanism prevents operation of the dosing mechanism when no container is in the container seat and allows operation of the dosing mechanism when a container is in the container seat. The container adapter includes an adapter container seat to hold the container in a predefined position, a joint structure detachably positioned in the container seat of the medical delivery device that connects the adapter container seat to the dosing mechanism, and an unlock mechanism configured to activate the lock mechanism when the joint structure is positioned in the container seat and the container is properly held in the adapter container seat, and to prevent activation of the lock mechanism when the container is not properly held in the adapter container seat.

13 Claims, 3 Drawing Sheets

(58) Field of Classification Search
CPC .. A61M 2039/1044; A61M 2005/2073; A61M 2005/2451
See application file for complete search history.

(56) References Cited

FOREIGN PATENT DOCUMENTS

| | | | |
|---|---|---|---|
| JP | 2019502442 | A | 1/2019 |
| WO | 2017/102760 | A1 | 6/2017 |
| WO | 2019/086589 | A1 | 5/2019 |

OTHER PUBLICATIONS

Notice of Reasons for Rejection issued Sep. 3, 2024 in JP Appl. No. 2022-546334.

* cited by examiner

CONTAINER ADAPTER AND DELIVERY ASSEMBLY

TECHNICAL FIELD

The present invention relates to a container adapter according to the preamble of independent claim 1 and, more particularly, to a delivery assembly with a medical delivery device and such an adapter.

Container adapters of that kind typically have an adapter container seat configured to hold a container in a predefined position, and a joint structure configured to be detachably positioned in the container seat of a medical delivery device and to connect the adapter container seat to a dosing mechanism of the medical delivery device when the joint structure is positioned in the container seat of the medical delivery device. They can be used for delivering a liquid stored in a container, such as a medicament or drug substance stored in a vial, in a definable dosage. For example, such delivery can be injection.

BACKGROUND ART

Delivering a liquid or other fluid out of a container is required in many medical applications and performed in a plurality of different ways. Particularly, where it is essential that the liquid is comparably precisely provided, specific devices are commonly used. For example, liquid pharmaceutical or drug substances are often provided in glass or plastic vials which are closed by a septum or rubber plug and a cap clamped around it or another similar seal cover.

Conventionally, for delivering the pharmaceutical substance out of vials, syringes are used. Thereby, a transfer needle attached to a syringe penetrates the septum or cover and the pharmaceutical substance is withdrawn into the syringe through the transfer needle. Once transferred into the syringe, the pharmaceutical substance is delivered in an appropriate manner. For example, the substance can be, e.g. subcutaneously or intramuscularly, injected via an injection needle or it can be orally applied or provided as droplets, e.g., in the eyes or nose of the patient.

However, delivering liquids from vials or containers by means of syringes usually is comparably difficult. It typically makes it necessary that an educated person such as a doctor or a nurse is involved. In particular, in cases where the dosage of liquid delivered has to be comparably precise such as when comparable small volumes as in a range of ten microliter to about one milliliter are involved patients are typically not capable of performing the delivery themselves when using a syringe or a similar device.

For being able to accurately provide the pharmaceutical or drug substances in containers or vials there exist devices which allow a particularly convenient and user friendly dosing. For example, WO 2017/102760 A1 shows a medical delivery device having a vial seat for holding a vial in a predefined position, a dosage chamber and a dosing mechanism to transfer a liquid substance from the vial to the dosage chamber.

For safety reasons, a lock mechanism is provided adapted to prevent operation of the dosing mechanism when no vial is held in the vial seat and to allow operation of the dosing mechanism when the vial is held in the vial seat. In use, the vial containing the drug substance to be administered is positioned in the vial seat. Thereby, a cap of the vial is pierced such that an interior of the vial is accessed. Also, the lock mechanism is activated such that the medical delivery device is free for dosing. By turning a dial unit of the medical delivery device with respect to a body part of the medical delivery device, the drug substance is withdrawn from the vial into the dosage chamber in a controlled and well definable manner. When an appropriate amount is dosed, the dial unit together with the vial is retracted from the body part and the drug substance is delivered from the dosage chamber, e.g., by injection.

However, a problem occurring in many pharmaceutical applications is that drug substances are not stable enough for being stored for an appropriate time. Or, they may require a comparably cumbersome handling or storage in order not to be affected before administration. Also, a specific composition of the drug substances may vary from one patient or application to the other. Therefore, some drug substances are provided in plural components which have to be mixed before administration. For example, it is known to provide components of a drug substance in plural vials. Before administration, the components are mixed, e.g., by transferring components from one vial to another one by means of a syringe. Thereby, it typically is difficult to maintain hygienic or sterility standards and to ensure accurate handling.

Furthermore, in some applications it is desired to combine the content of different vials in order to prepare an appropriate dosage. In particular, vials of different fill volumes of a drug substance may be combined to achieve a specific dosage. This allows for providing the drug substance in smaller volumes such that wastage of the drug substance can be reduced. Particularly, when comparably costly drug substances are involved this may be beneficial.

For addressing these issues, WO 2019/086589 A1 suggests a container or vial adapter to be used as intermediate carrier for mounting a container or vial to the medical delivery device. In particular, for being used with a vial, the vial adapter has an adapter container seat configured to hold the vial in a predefined position, and a joint structure configured to be detachably positioned in a container seat of the medical delivery device and to connect the adapter container seat to a dosing mechanism of the medical delivery device. By being detachable, the vial adapter allows for connecting plural vials to the medical delivery device one after the other. Like this, substances of plural vials can be combined before administration. For example, a first liquid drug substance can be withdrawn from a first vial positioned in a first vial adapter. Once an accurate amount of the first drug substance is in a dosage chamber of the medical delivery device, the first vial adapter is detached from the medical delivery device. Then a second vial adapter holding a second vial housing a second or the same first liquid drug substance is positioned in the container seat of the medical delivery device. Then, the second drug substance is withdrawn from the second vial and transferred to the dosage chamber of the medical delivery device. Thereby, the drug substances of the first and second vials are combined in the dosage chamber of the medical delivery device.

Even though such container adapters are suitable for addressing the issues mentioned above in connection with known medical delivery devices, problems may result from the fact that, when the container adapter is positioned in the container seat of the medical delivery device, the medical delivery device is in an unlocked state in which the medical delivery device can be operated to dose an amount of substance to the dosage chamber. Where the provision of a lock mechanism in the medical delivery device aims to assure that dosing, i.e. withdrawal of a liquid into the dosage chamber, can only be performed if a container or vial is positioned in the container seat of the medical delivery device, this security measure becomes inoperative when using the container adapter. More specifically, since the container adapter itself activates the unlock mechanism such that the medical delivery device is in the unlocked state once the adapter is positioned in the container seat, it cannot be assured that a container or vial connected to the medical delivery device but the container adapter only. Thus, it might occur that no container is positioned in the container adapter when the latter is positioned in the container seat of the medical delivery device. Or, the container may not properly be held in the container adapter such that its interior is not accessible as intended. Such faulty arrangements may result in compromising the dosing by the medical delivery device.

Therefore, there is a need for a system allowing to increase safety in operation of a medical delivery device and to ensure dosing accuracy of the medical delivery device, when using a container adapter.

Disclosure of the Invention

According to the invention this need is settled by a container adapter as it is defined by the features of independent claim 1, and by a delivery assembly as it is defined by the features of independent claim 12. Preferred embodiments are subject of the dependent claims.

In one aspect, the invention is a container adapter for a medical delivery device. The medical delivery device can particularly be a device for administering a liquid substance. For example, it can be a drug delivery device for applying a liquid medicament or drug substance. With such delivery devices the liquid substance or drug substance can be delivered or administered in an appropriate form such as by droplets for the eye, by oral dosages or the like. In particular, the medical delivery device can be an injection device for subcutaneously or intramuscularly injecting the drug substance.

The medical delivery device typically has a delivery orifice that can be shaped for a particular application or administration of the substance or medicament to be delivered. The delivery orifice can be a needle if, for example, the medical delivery device is intended for injecting the medicament. In such an embodiment the delivery orifice or needle can extend from the interior of a housing through its proximal opening out of the housing or a specific part thereof. The delivery orifice can also be adapted for being connected to a delivery member. For example, it can comprise a male or female part of a Luer lock or Luer taper connector and the delivery member can be equipped with a corresponding female or male Luer lock connector. Other examples of delivery orifices are nozzles, valves, fluid guides or the like.

In particular, the medical delivery device involved with the container adapter according to the invention can be a medical delivery device as described in WO 2017/102760 A1. Such a medical delivery device specifically has a container seat for holding a container in a predefined position, a dosage chamber, a dosing mechanism to transfer a liquid from the container held in the container seat to the dosage chamber and a lock mechanism adapted to prevent operation of the dosing mechanism when no container is held in the container seat and to allow operation of the dosing mechanism when the container is held in the container seat.

The container adapter has an adapter container seat, a joint structure and an unlock mechanism. The adapter container seat is configured to hold a container in a predefined position. The joint structure is configured to be detachably positioned in the container seat of the medical delivery device and to connect the adapter container seat to the dosing mechanism of the medical delivery device when the joint structure is positioned in the container seat of the medical delivery device. The unlock mechanism is configured to activate the lock mechanism of the medical delivery device when the joint structure is positioned in the container seat of the medical delivery device and the container is properly held in the adapter container seat. Further, the unlock mechanism is configured to prevent activation of the lock mechanism of the medical delivery device when the container is not properly held in the adapter container seat.

The term "container" as used herein can relate to any liquid reservoir suitable for storing and transporting a liquid, other fluid, powder such as a lyophilized substance or capsules. Where the liquids, fluids or powders are drug substances or components thereof or the like, the container can particularly be a vial. The term "vial" as used in this connection can relate to a comparably small vessel or bottle, commonly used to store pharmaceutical substances or pharmaceuticals or medicaments in liquid, powdered or capsuled form. The vial can be made of a sterilisable material such as glass or plastic such as, e.g., polypropylene. The container can also comprise plural sub-containers such as plural vials. The term "predefined position" in this context can be such that an opening of the container is oriented towards the delivery orifice. Such a container seat allows for connecting a container at a well predefined position and orientation. This allows for efficiently coupling a container to the system or medical delivery device.

The term "drug" as used herein relates to a therapeutically active agent, also commonly called active pharmaceutical ingredient (API), as well as to a combination of plural such therapeutically active substances. The term also encompasses diagnostic or imaging agents, like for example contrast agents (e.g. MRI contrast agents), tracers (e.g. PET tracers) and hormones, that need to be administered in liquid form to the patient.

The term "drug substance", "pharmaceutical substance" or "pharmaceutical" as used herein relates to a drug as defined above formulated or reconstituted in a form that is suitable for administration to the patient. For example, besides the drug, a drug substance may additionally comprise an excipient and/or other auxiliary ingredients. A particularly preferred drug substance in the context of the invention is a drug solution, in particular a solution for oral administration, injection or infusion.

The term "drug product" as used herein or similar relates to a finished end product comprising a drug substance or a plurality of drug substances. In particular, a drug product may be a ready to use product having the drug substance in an appropriate dosage and/or in an appropriate form for administration. For example, a drug product may include an administration device such as a prefilled syringe or the like.

In order to be detachably positionable in the container seat of the medical delivery device, the joint structure is arranged appropriately. Thereby, it can have a shape or form adapted to the configuration of the container seat of the medical delivery device. Thus, the joint structure of the container adapter is arranged to be held by means of the container seat of the medical delivery device it is intended to be used with but without being permanently fixed to it. For example, the joint structure can have a section formed in correspondence with a section of the container to which the medical delivery device is adapted.

The adapter container seat of the container adapter can have a similar configuration, or the same configuration, as the container seat of the medical delivery device. Stated another way, the adapter container seat of the container adapter can receive and hold a container in the same specific manner as a container seat of the medical delivery device receives and holds a container. As the skilled person is aware, container seats of medical delivery devices can be configured in many ways to hold the container in the predefined position. In particular, they typically are adjusted to the shape or design of the specific container they are to be used with. For example, the container seat can be configured with a snap mechanism, e.g. having flexible arms and/or protrusions, to grab a neck of the container, with a clamp mechanism for clamping a body of the container, with a sleeve to house and guide the container, or the like.

The term "properly held" in connection with the container and the adapter container seat relates to an arrangement of the container in which the interior of the container can be accessed as intended. Thereby, the container can be positioned in a specific location and/or orientation in the adapter container seat. The container can be not properly held, when the container is only partially arranged in the seat or not pressed/moved on the seat to a sufficient extent. Also the term "not properly held" in this connection covers situations where no container is positioned or held in the adapter container seat at all.

The term "activate the lock mechanism" in connection with the unlock mechanism relates to adapting the medical delivery device such that dosing operation of the medical delivery device is possible. Whereas such dosing operation typically is prevented or not possible without activating the lock mechanism, after activation the medical delivery device is in a position to dose. Thereby, activating the lock mechanism may involve changing the medical delivery device from a lock state, in which dosing is prevented or locked, to a dosing state, in which dosing is possible.

By being equipped with the unlock mechanism, the container adapter according to the invention allows for ensuring the lock mechanism of the medical delivery device properly works, also when the container adapter is used instead of directly seating the container into the medical delivery device. More specifically, the unlock mechanism may make sure that the lock mechanism of the medical delivery device is only activated when the container is properly held in the adapter container seat. Thereby, activation of the lock mechanism may result in changing the medical delivery device from the lock state into the dosing state. In this dosing state, the medical delivery device can be operated, i.e. substance can be transferred from the container in the container adapter into the dosage chamber of the medical delivery device. In cases where no container is arranged in the adapter container seat or when the container is not properly held in the adapter container seat, the lock mechanism of the medical delivery device is not activated. Thus, the medical delivery device may remain in the lock state in which no dosing is possible.

Like this, compared to known container adapters of the kind, the container adapter according to the invention allows to increase safety in operation of the medical delivery device and to ensure dosing accuracy of the medical delivery device.

Preferably, the unlock mechanism comprises an activation member movable relative to the adapter container seat from a non-activating position in which the lock mechanism of the medical delivery device is not activated, when the joint structure is positioned in the container seat of the medical delivery device, to an activating position in which the lock mechanism of the medical delivery device is activated when the joint structure is positioned in the container seat of the medical delivery device. The activation member can be a multi part unit and, more specifically, a single part unit. Since the adapter container seat typically is positioned at a different location than activation of the lock mechanism has to be initiated, the recognition that the container is properly held in the adapted container seat has to be transmitted to the location where the lock mechanism is to activate. Such transmission can efficiently be implemented by the activation member being moved. In a reliable and comparably simple embodiment, the movement of the activation member can be a quasi linear movement. In particular, it can be a movement along a longitudinal axis of the medical delivery device or an axis of the container adapter.

Thereby, the activation member of the unlock mechanism preferably is arranged to be moved by the container from the non-activating position to the activating position, while the container is set into the adapter container seat. Such simultaneous movement of the activation member and setting of the container in the adapter container seat can ensure that the activation member is in the activating position once the container is properly set or positioned. Thereby, the term "is set into the adapter container seat" can relate to a period of time where the container is positioned in the adapter container seat.

The activation member of the unlock mechanism preferably has a container face, wherein the unlock mechanism is configured such that the container contacts the container face to move the activation member while the container is set into the adapter container seat. Such container face can allow for a reliable movement of the activation member while setting the container into the adapter container seat.

Preferably, the activation member of the unlock mechanism has a lock mechanism face wherein the unlock mechanism is configured such that the lock mechanism face contacts a push portion of the lock mechanism of the medical delivery device to activate the lock mechanism of the medical delivery device when the container is held into the adapter container seat and while the joint structure is positioned in the container seat of the medical delivery device while. In particular, the push portion of the lock mechanism can be axially displaced while the container adapter is attached to the medical delivery device when the container is held in the adapter container seat. Such lock mechanism face allows for efficiently moving the lock mechanism of the medical delivery device via its push portion.

The activation member of the unlock mechanism preferably has a stem portion extending from the adapter container seat to the joint structure. The stem portion can form an efficient transmitter to initiate activation of the lock mechanism of the delivery device when the container is held in the adapter container seat. The stem portion can extend along a longitudinal axis of the medical device or the system. It can be essentially straight or define an essentially straight axis itself.

Thereby, the container face preferably is arranged at one longitudinal end of the stem portion and the lock mechanism face is arranged at an opposite longitudinal end of the stem portion. Like this, the stem portion allows the activation member to reliably contact the container and the lock mechanism which both are positioned at different locations.

Preferably, the activation member of the unlock mechanism has a guiding portion configured to define a movement of the activation member to a predefined path. Such guiding portion allows to provide a reliably movement of the activation member. Movements of the activation member in other directions not required to activate the lock mechanism can be prevented.

Thereby, the guiding portion of the activation member preferably comprises a ring. Such ring can be positioned around an axial portion of the adapter container to ensure that the activation member is only axially moved. For example, the ring can be arranged about a post of the joint structure required to transfer liquid from the container to the medical delivery device.

Preferably, the unlock mechanism comprises a holding structure configured to hold the activation member in the non-activating position. Such holding structure can be embodied by the activation member engaging a portion of the container adapter such as of the adapter container seat or the joint structure. For example, the activation member or its stem portion can be equipped with a recess engaging a portion of the adapter container seat.

Thereby, the activation member of the unlock mechanism preferably is configured to be elastically deformed while the container is set into the adapter container seat such that the activation member is disengaged. In particular, when being disengaged the activation member is not held. Thus, it is moveable and particularly movable to activate the lock mechanism of the medical delivery device.

Further, the adapter container seat can have a fixation structure adapted to irremovably hold the container in the predefined position. In particular, the fixation structure of the adapter container seat can have a clip arranged to snap behind a head portion of the container when the container is held in the adapter container seat.

The container adapter can comprise an alignment formation configured to assure that the container adapter is in a predefined orientation relative to the medical delivery device when the joint structure is positioned in the container seat of the medical delivery device.

The joint structure can be configured to form an open tight duct between an interior of the container and the dosing mechanism of the medical delivery device when the container is held in the adapter container seat and the joint structure is positioned in the container seat of the medical delivery device.

The adapter container seat may comprise a spike configured to penetrate a cap of an opening of the container, when the container is held in the adapter container seat. The spike of the adapter container seat can comprise a tip. Further, the spike can have a conduit which runs from the tip longitudinally through the spike.

The container adapter can further comprise a seal which seals the container seat of the medical delivery device to the joint structure, when the joint structure is positioned in the container seat of the medical delivery device. The joint structure may comprise a seal holder in which the seal is tightly arranged.

In another aspect, the invention is a delivery assembly comprising a container adapter as described above and a medical delivery device. The medical delivery device comprises a container seat for holding a container in a predefined position, a dosage chamber, a dosing mechanism to transfer a liquid from the container held in the container seat to the dosage chamber and a lock mechanism adapted to prevent operation of the dosing mechanism when no container is held in the container seat and to allow operation of the dosing mechanism when the container is held in the container seat.

The delivery assembly according to the invention and its embodiments described below allow for achieving the effects and benefits described above in connection with the container adapter according to the invention and its preferred embodiments.

The container seat of the medical delivery device preferably has a fixation structure adapted to irremovably hold a container in a predefined position and the joint structure of the container adapter is arranged to prevent interaction with the fixation structure of the container seat of the medical delivery device, when the container adapter is held in the container seat of the medical delivery device. For example, the joint structure can be formed with an at least in one orientation reduced diameter compared to a container in order to prevent interaction. Such an arrangement allows for mounting the container adapter to the medical delivery device without being fixed by the latter. Like this, it can be achieved that the container adapter can be retracted or removed from the medical delivery device after dosing and that the medical delivery device is ready for receiving a further container or a further container adapter.

Preferably, the lock mechanism of the medical delivery device comprises a push portion, the push portion of the lock mechanism and the activation member of the container adapter being arranged to interact when the container adapter is forwarded into the container seat of the medical delivery device, such that the push portion of the lock mechanism is axially displaced while the joint structure of the container adapter is positioned in the container seat of the medical delivery device and when the container is held in the adapter container seat of the container adapter. The push portion can have an abutting face which contacts the lock mechanism face of the activation member of the unlock mechanism of the container adapter when the lock mechanism of the medical delivery device is activated. Such arrangement allows for efficiently and automatically unlocking the medical delivery device, i.e. activating the lock mechanism, when positioning the joint structure of the container adapter in the container seat of the medical delivery device or when positioning the container in the adapter container seat.

Preferably, the lock mechanism of the medical delivery device comprises a pull portion and the unlock mechanism of the container adapter comprises an engaging surface, the pull portion of the lock mechanism and the engaging surface of the unlock mechanism being arranged to inter-engage when the container adapter is forwarded into the container seat of the medical delivery device, such that the pull portion of the lock mechanism is axially displaced when the container adapter is retracted from the medical delivery device. In particular, the unlock member can pull the lock mechanism when the container adapter is detached. Such arrangement allows for efficiently and automatically relocking the medical delivery device when removing or retracting the container adapter from the medical delivery device.

BRIEF DESCRIPTION OF THE DRAWINGS

The container adapter according to the invention and the delivery assembly according to the invention are described in more detail herein below by way of an exemplary embodiment and with reference to the attached drawings, in which.

DESCRIPTION OF EMBODIMENTS

In the following description certain terms are used for reasons of convenience and are not intended to limit the invention. The terms “right”, “left”, “up”, “down”, “under” and “above” refer to directions in the figures. The terminology comprises the explicitly mentioned terms as well as their derivations and terms with a similar meaning. Also, spatially relative terms, such as “beneath”, “below”, “lower”, “above”, “upper”, “proximal”, “distal”, and the like, may be used to describe one element’s or feature’s relationship to another element or feature as illustrated in the figures. These spatially relative terms are intended to encompass different positions and orientations of the devices in use or operation in addition to the position and orientation shown in the figures. For example, if a device in the figures is turned over, elements described as “below” or “beneath” other elements or features would then be “above” or “over” the other elements or features. Thus, the exemplary term “below” can encompass both positions and orientations of above and below. The devices may be otherwise oriented (rotated 90 degrees or at other orientations), and the spatially relative descriptors used herein interpreted accordingly. Likewise, descriptions of movement along and around various axes include various special device positions and orientations.

To avoid repetition in the figures and the descriptions of the various aspects and illustrative embodiments, it should be understood that many features are common to many aspects and embodiments. Omission of an aspect from a description or figure does not imply that the aspect is missing from embodiments that incorporate that aspect. Instead, the aspect may have been omitted for clarity and to avoid prolix description. In this context, the following applies to the rest of this description: If, in order to clarify the drawings, a figure contains reference signs which are not explained in the directly associated part of the description, then it is referred to previous or following description sections. Further, for reason of lucidity, if in a drawing not all features of a part are provided with reference signs it is referred to other drawings showing the same part. Like numbers in two or more figures represent the same or similar elements.

Figure 1:
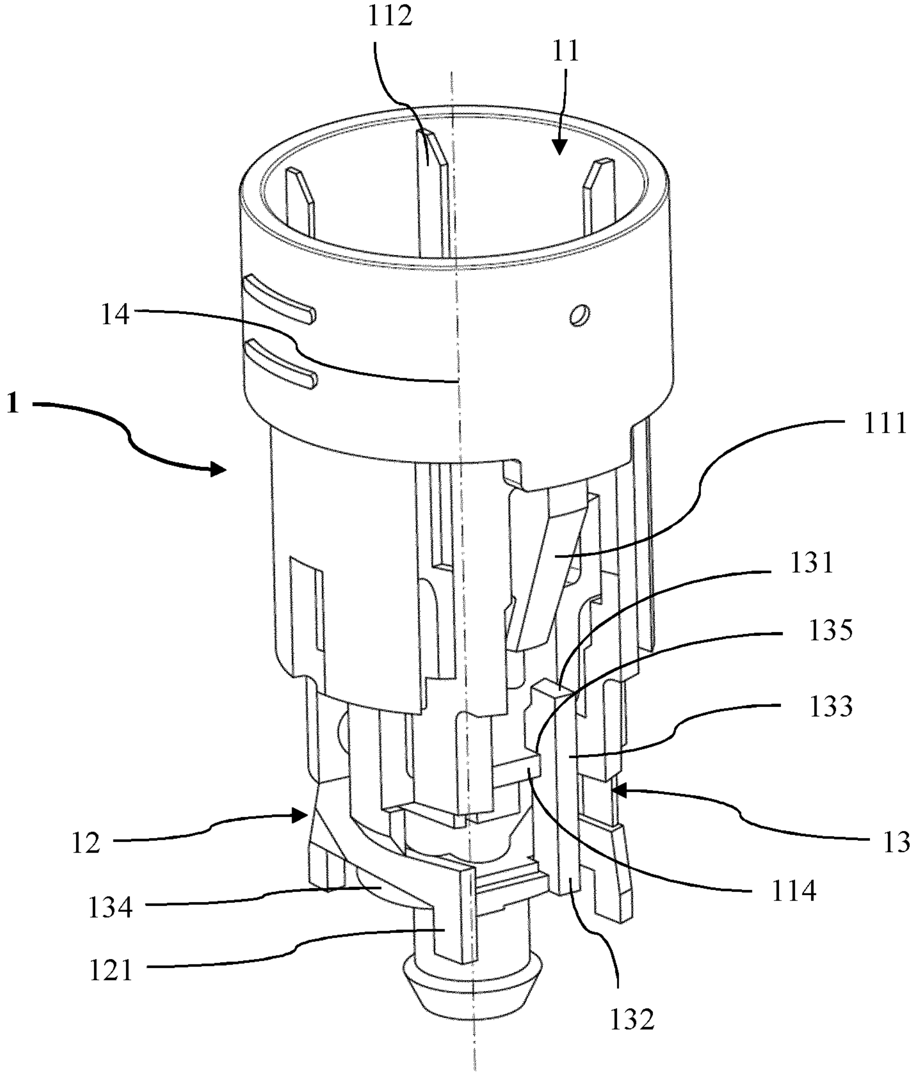
FIG. 1 shows a perspective view of an embodiment of a container adapter according to the invention.

FIG. 1 shows perspective view of a vial adapter 1 as an embodiment of a container adapter according to the invention. The vial adapter 1 has an upper adapter vial seat 11 as adapter container seat and a lower joint structure 12. The adapter vial seat 11 has a ring shaped upper end portion which is equipped with plural vertical guide ribs 112 as alignment formation at its interior circumference. The lower end of the adapter vial seat 11 is formed by a base plate 114. Further, the adapter vial seat 11 is equipped with two lateral clip arms 111 as fixing structure. The joint structure 12 comprises a spike recess 121 having a post portion with an essentially cylindrical circumference.

The vial adapter 1 further comprises an unlock mechanism with an activation member 13. The activation member 13 has a guiding portion in the form of a ring 134 arranged around the post portion of the spike recess 121 of the joint structure 12. Further, the activation member has a stem portion 133 with a lateral recess 135. The stem portion 133 vertically extends from the ring 134 in an upward direction. The recess 135 is open in a radial direction towards a central longitudinal adapter axis 14 of the vial adapter 1. More specifically, the base plate 114 of the adapter vial seat 11 extends into the recess 135 of the activation member 13 such that a holding structure is formed which holds the activation member 13 in a non-activating position. The top end side of the stem portion 133 of the activation member forms a container face 131 and the lower end side a lock mechanism face 132.

Figure 2:
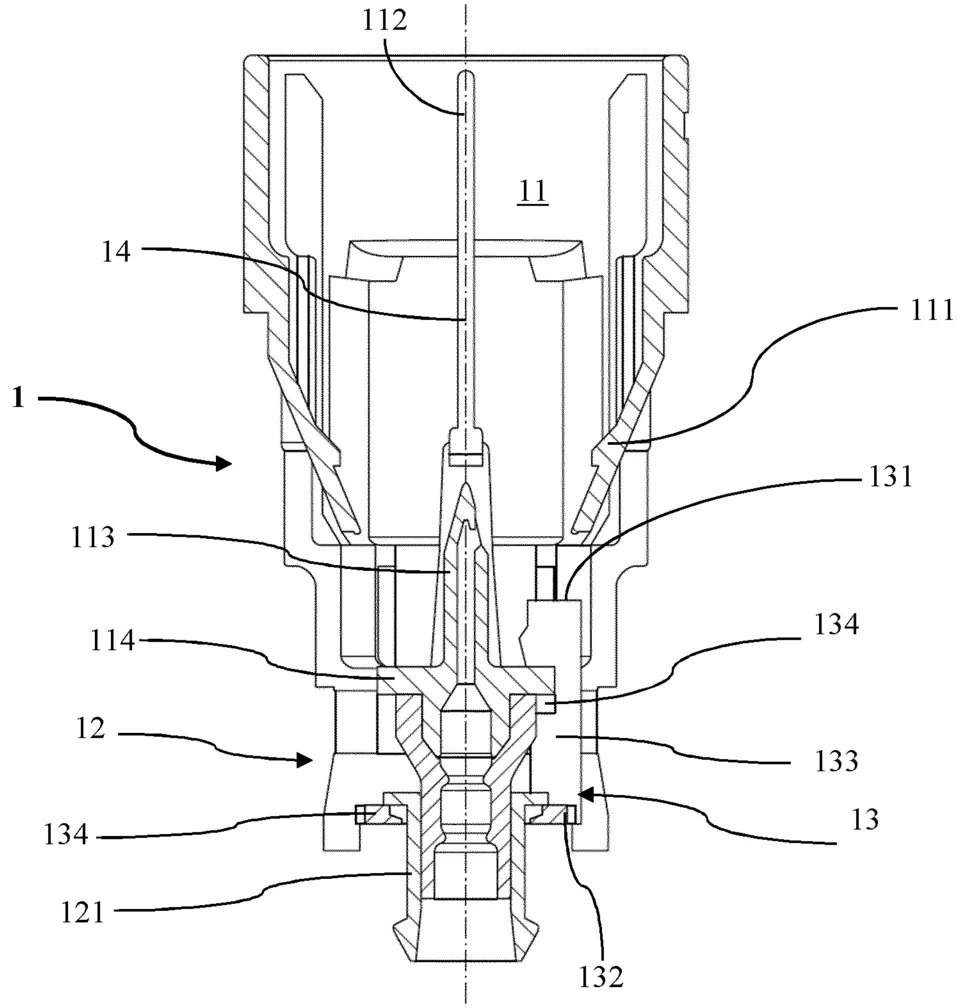
FIG. 2 shows a cross sectional side view of the container adapter of FIG. 1.

In FIG. 2, a central cross section along the adapter axis 14 of the vial adapter 1 is shown. There, it can be seen that from the base plate 114 an adapter spike 113 vertically extends into an interior of the adapter vial seat 11. The adapter spike 113 has a tip and an inner duct radially exiting below the tip. The duct of the adapter spike 113 passes over into a hollow interior of the spike recess 121, which downwardly opens.

As can be best seen in FIG. 2, the stem portion 133 of the activation member 13 extends from the joint structure 12 above the base plate 114 into the interior of the adapter vial seat 11. Like this, the activation member forms a connection between the adapter vial seat 11 and the joint structure 12. The clip arms 111 downwardly extend from the upper end portion of the adapter vial seat, wherein they incline towards the adapter axis 14.

Figures 3, 4:
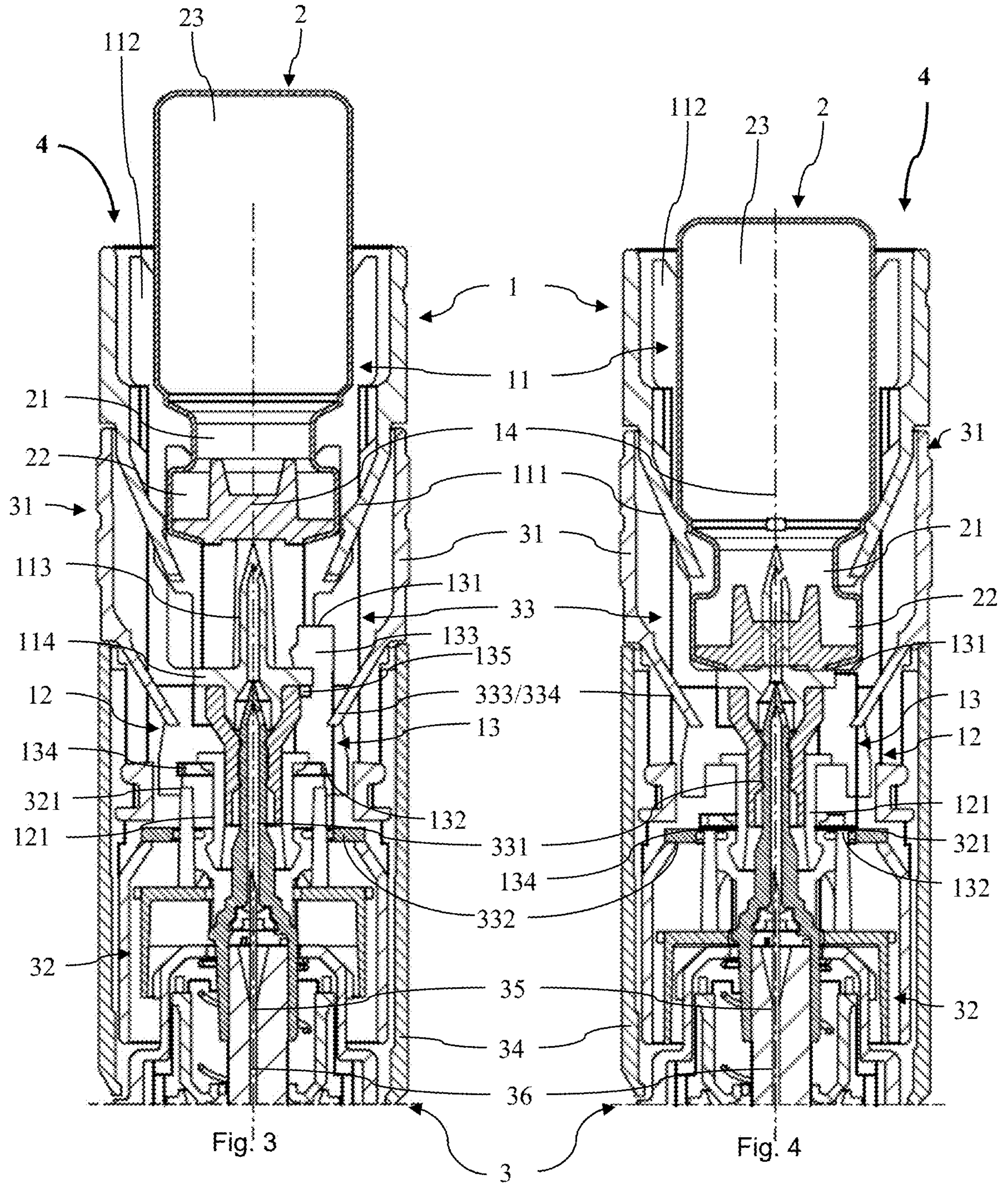
FIG. 3 shows a cross sectional side view of an embodiment of a delivery assembly according to the invention including the container adapter of FIG. 1, wherein a vial is not properly set into the container adapter.
FIG. 4 shows a cross sectional side view of the delivery assembly of FIG. 3, wherein the vial is properly set into the container adapter.

FIG. 3 shows an embodiment of a delivery assembly 4 according to the invention including a medical delivery device 3 and the vial adapter 1. The medical delivery device 3 (only those parts of which are show in FIGS. 3 and 4 which are essential for the understanding of the present invention) has an upper dial unit 31 and a lower housing 34. The dial unit 31 comprises a vial seat 33 as container seat, which is similarly set up as the adapter container seat 11 described above. In particular, the vial seat 33 has a bottom base plate 332 from which a spike 331 vertically extends in an upward direction. It is further equipped with plural clip arms 333 as fixation structure 334 which are inclined towards a central longitudinal device axis 36. The vial adapter 1 is set in or mounted to the medical delivery device 3 by the joint structure 12 being positioned in the vial seat 33. Thereby, the joint structure 12 is configured such that the clip arms 333 of the vial seat 33 do not engage or otherwise interact with the vial adapter 1. Thus, the vial adapter 1 is not fixed to the medical delivery device 3 but can be detached, if desired. The adapter axis 14 is in one line with the device axis 36.

The spike 331 of the medical delivery device 3 extends into the hollow interior of the spike recess 121 of the vial adapter 1. At a bottom end of the spike 331 a needle 35 is arranged. Thereby, a continuous duct is formed from the needle through the spike 331 and the adapter spike 113 opening at the adapter spike 113 towards the interior of the adapter vial seat 11.

The medical delivery device 3 further has a lock mechanism 32 with a vertical push portion 321. In particular, in FIG. 3, the lock mechanism 32 is in a locked state in which rotation of the dial unit 31 relative to the housing 34 about the device axis 36 is blocked. Thereby, in the locked state the push portion 321 of the lock mechanism 32 is located adjacent and at a small distance to the activation member 13.

As shown in FIG. 3, a vial 2 is introduced top down into the adapter vial seat 11. The vial 2 is a conventional glass vial having a body 23 passing over into a head 22 via a neck 21. The head 22 has an opening closed by a cover with a septum. In the situation depicted in FIG. 3, the vial 2 is not fully positioned in the adapter vial seat 11, i.e. not properly held in the adapter vial seat 11. Thereby, the unlock mechanism of the vial adapter 1 still is in the non-activating position.

However, in FIG. 4 the vial 2 is shown fully positioned in the adapter vial seat 13, i.e. properly held in the adapter vial seat 11. There, the clip arms 113 of the adapter vial seat 13 are clipped behind the head 21 of the vial 2 such that it irremovably is mounted to the vial adapter 1. Thereby, the adapter spike 113 pierces the septum of the head 21 of the vial 2 such that an interior of the vial 2 is accessed by the adapter spike 113.

When moving the vial 2 from the position of FIG. 3 to the position of FIG. 4, the head 22 abuts the container face 131 of the activation member 13. Thereby, due to the slanted design of the container face 131 and the elasticity of the stem portion 133, the activation member 13 is outwardly bent such that the recess 135 disengages from the base plate 114. Like this, the activation member 13 is no longer held but moved downwardly by the head 22 of the vial 2 pushing it into an activating position. In turn, the 132 lock mechanism face 132 of the activation member 13 abuts the push portion 321 of the lock mechanism 32 of the medical delivery device 3 and downwardly moves the push portion 321. Like this, the lock mechanism 32 is activated by being changed to an unlocked state in which the dial unit 31 can be rotated about the axis 36 relative to the housing 34. Such rotation causes a liquid in the interior of the vial 2 being transferred to a dosage chamber (not shown) of the medical delivery device 3 via the adapter spike 113, the spike 331 and the needle 36. Thus, the activation member 13 of the vial adapter 1 allows for preventing operation of the dial unit 31 when the vial 2 is not properly positioned in the adapter vial seat 11.

This description and the accompanying drawings that illustrate aspects and embodiments of the present invention should not be taken as limiting-the claims defining the protected invention. In other words, while the invention has been illustrated and described in detail in the drawings and foregoing description, such illustration and description are to be considered illustrative or exemplary and not restrictive. Various mechanical, compositional, structural, electrical, and operational changes may be made without departing from the spirit and scope of this description and the claims. In some instances, well-known circuits, structures and techniques have not been shown in detail in order not to obscure the invention. Thus, it will be understood that changes and modifications may be made by those of ordinary skill within the scope and spirit of the following claims. In particular, the present invention covers further embodiments with any combination of features from different embodiments described above and below.

The disclosure also covers all further features shown in the Figs. individually although they may not have been described in the afore or following description. Also, single alternatives of the embodiments described in the figures and the description and single alternatives of features thereof can be disclaimed from the subject matter of the invention or from disclosed subject matter. The disclosure comprises subject matter consisting of the features defined in the claims or the exemplary embodiments as well as subject matter comprising said features.

Furthermore, in the claims the word "comprising" does not exclude other elements or steps, and the indefinite article "a" or "an" does not exclude a plurality. A single unit or step may fulfil the functions of several features recited in the claims. The mere fact that certain measures are recited in mutually different dependent claims does not indicate that a combination of these measures cannot be used to advantage.

The terms "essentially", "about", "approximately" and the like in connection with an attribute or a value particularly also define exactly the attribute or exactly the value, respectively. The term "about" in the context of a given numerate value or range refers to a value or range that is, e.g., within 20%, within 10%, within 5%, or within 2% of the given value or range. Components described as coupled or connected may be electrically or mechanically directly coupled, or they may be indirectly coupled via one or more intermediate components. Any reference signs in the claims should not be construed as limiting the scope.

LIST OF REFERENCE SIGNS

1 vial adapter (container adapter)
11 adapter vial seat (adapter container seat)
111 clip arms (fixing structure)
112 guide rib (alignment formation)
113 adapter spike
114 base plate
12 joint structure
121 spike recess
13 activation member
131 container face
132 lock mechanism face
133 stem portion
134 ring (guiding portion)
135 recess (holding structure)
14 adapter axis
2 vial (container)
21 neck
22 head
23 body
3 medical device
31 dial unit
32 lock mechanism
33 vial seat (container seat)
331 spike
332 base plate
333 clip arms (fixing structure)
34 housing
35 needle
36 device axis

The invention claimed is:

1. A container adapter for a medical delivery device, said medical delivery device has a container seat for holding a container in a predefined position, a dosage chamber, a dosing mechanism comprising a dial unit rotatable about a device axis relative to a body part of the medical delivery device, wherein rotation of the dial unit causes a transfer of a liquid from the container held in the container seat to the dosage chamber and a lock mechanism having a locked state and an unlocked state, the lock mechanism comprising an axially displaceable portion defining an abutting face that is configured to be pushed, wherein the lock mechanism in the locked state is adapted to prevent operation of the dosing mechanism when no container is held in the container seat and wherein the lock mechanism in the unlocked state is adapted to allow operation of the dosing mechanism when the container is held in the container seat, the container adapter comprising:

an adapter container seat configured to hold a container in a predefined position;

a joint structure configured to be detachably positioned in the container seat of the medical delivery device and to connect the adapter container seat to the dosing mechanism of the medical delivery device when the joint structure is positioned in the container seat of the medical delivery device; and an unlock mechanism comprising an activation member having a container face configured to contact the container and a lock mechanism face configured to contact the abutting face of the axially displaceable portion of the lock mechanism, wherein the activation member is movable between a non-activating position and an activating position, wherein the activation member is configured to activate the lock mechanism of the medical delivery device when the joint structure is positioned in the container seat of the medical delivery device and the container is properly held in the adapter container seat, and to prevent activation of the lock mechanism of the medical delivery device when the container is not properly held in the adapter container seat.

2. The container adapter of claim 1, wherein the activation member is movable relative to the adapter container seat from the non-activating position in which the lock mechanism of the medical delivery device is not activated when the joint structure is positioned in the container seat of the medical delivery device to the activating position in which the lock mechanism of the medical delivery device is activated when the joint structure is positioned in the container seat of the medical delivery device.

3. The container adapter of claim 2, wherein the activation member of the unlock mechanism is arranged to be moved by the container from the non-activating position to the activating position while the container is set into the adapter container seat.

4. The container adapter of claim 3, wherein the unlock mechanism is configured such that the container contacts the container face to move the activation member while the container is set into the adapter container seat.

5. The container adapter of claim 3, wherein the unlock mechanism is configured such that the lock mechanism face contacts the abutting face of the axially displaceable portion of the lock mechanism of the medical delivery device to activate the lock mechanism of the medical delivery device when the container is held into the adapter container seat and while the joint structure is positioned in the container seat of the medical delivery device.

6. The container adapter of claim 5, wherein the activation member of the unlock mechanism has a stem portion extending from the adapter container seat to the joint structure.

7. The container adapter of claim 6, wherein the container face is arranged at one longitudinal end of the stem portion and the lock mechanism face is arranged at an opposite longitudinal end of the stem portion.

8. The container adapter of claim 2, wherein the activation member of the unlock mechanism includes a ring configured to define a movement of the activation member to a predefined path.

9. The container adapter of claim 2, wherein the unlock mechanism comprises a holding structure configured to hold the activation member in the non-activating position.

10. The container adapter of claim 9, wherein the activation member of the unlock mechanism is configured to be elastically deformed while the container is set into the adapter container seat such that the activation member is disengaged.

11. A delivery assembly comprising:

a container adapter according to claim 1; and a medical delivery device, wherein the medical delivery device comprises a container seat for holding a container in a predefined position, a dosage chamber, a dosing mechanism comprising a dial unit rotatable about a device axis relative to a body part of the medical delivery device, wherein rotation of the dial unit causes a transfer of a liquid from the container held in the container seat to the dosage chamber, and a lock mechanism having a locked state and an unlocked state, the lock mechanism including an axially displaceable portion defining an abutting face that is configured to be pushed by the activation member of the unlock mechanism, wherein the lock mechanism in the locked state is adapted to prevent operation of the dosing mechanism when no container is held in the container seat and wherein the lock mechanism in the unlocked state is adapted to allow operation of the dosing mechanism when the container is held in the container seat.

12. The delivery assembly of claim 11, wherein the container seat of the medical delivery device has a fixation structure adapted to irremovably hold a container in a predefined position and the joint structure of the container adapter is arranged to prevent interaction with the fixation structure of the container seat of the medical delivery device, when the container adapter is held in the container seat of the medical delivery device.

13. The delivery assembly of claim 11, wherein axially displaceable portion of the lock mechanism and the activation member of the container adapter are configured to interact when the container adapter is forwarded into the container seat of the medical delivery device, such that the axially displaceable portion of the lock mechanism is axially displaced while the joint structure of the container adapter is positioned in the container seat of the medical delivery device and when the container is held in the adapter container seat of the container adapter.

* * * * *